United States Patent [19]
Anderson

[11] Patent Number: 5,298,158
[45] Date of Patent: Mar. 29, 1994

[54] REMOTE DUAL FILTRATION SYSTEM

[75] Inventor: David R. Anderson, Duluth, Minn.

[73] Assignee: A. J. Amatuzio Filter Co., Superior, Wis.

[21] Appl. No.: 928,032

[22] Filed: Aug. 11, 1992

[51] Int. Cl.⁵ .................................. B01D 27/00
[52] U.S. Cl. ............................. 210/168; 123/196 A;
184/6.24; 210/232; 210/253; 210/314;
210/416.5; 210/DIG. 13; 210/DIG. 17
[58] Field of Search ............... 123/196 A; 184/6.24;
210/168, 314, 232, 253, 416.5, 438, 439, 443,
453, DIG. 13, DIG. 17

[56] References Cited

U.S. PATENT DOCUMENTS

| | | | |
|---|---|---|---|
| 2,423,329 | 7/1947 | LeClair | 210/168 |
| 2,748,949 | 6/1956 | James | 210/168 |
| 3,975,273 | 8/1976 | Shaltz et al. | 210/DIG. 17 |
| 4,324,213 | 4/1982 | Kasting et al. | 123/196 A |
| 4,372,848 | 2/1983 | Manders | 210/168 |
| 4,406,784 | 9/1983 | Cochran | 210/168 |
| 4,452,695 | 6/1984 | Schmidt | 210/168 |
| 4,492,632 | 1/1985 | Mattson | 210/168 |
| 4,512,299 | 4/1985 | Egan et al. | 184/6.24 |
| 4,561,395 | 12/1985 | McMullen | 123/196 |
| 4,672,932 | 6/1987 | Schmidt | 123/196 |
| 4,676,206 | 6/1987 | De Grazia | 210/168 |
| 4,752,387 | 6/1988 | Thomas | 210/168 |
| 5,039,406 | 8/1991 | Whittington | 210/168 |
| 5,078,877 | 1/1992 | Cudaback et al. | 210/DIG. 17 |
| 5,217,606 | 6/1993 | Ramponi et al. | 210/DIG. 17 |

FOREIGN PATENT DOCUMENTS 551531 2/1943 United Kingdom ....... 210/DIG. 13

Primary Examiner—Peter A. Hruskoci
Attorney, Agent, or Firm—Foley & Lardner

[57] ABSTRACT

A remote dual filtration system for an internal combustion engine having an external mounting member mounted on the engine for receiving an adaptor through which unfiltered oil is directed from the engine and filtered oil flows to the engine. A remote dual filter mount is mounted in a convenient location remotely spaced from the engine, and hoses are provided for carrying unfiltered oil from the adapter to the remote filter mount, and filtered oil from the remote filter mount to the adaptor. A full flow filter and a partial flow filter having a high filtering efficiency are mounted on the remote filter mount. In order to overcome the greater resistance to the flow of oil in the partial flow filter, a restriction means is positioned in the path of oil flow into the full flow filter whereby oil flow into the partial flow filter is increased.

6 Claims, 3 Drawing Sheets

REMOTE DUAL FILTRATION SYSTEM

BACKGROUND OF THE INVENTION

The present invention relates generally to oil filter systems, and in particular to remotely mounted oil filter systems.

Oil is the life blood of an internal combustion engine. We ask it to perform a number of tasks, from reducing component wear to maintaining internal cleanliness. While performing their duties, engine oils are exposed to a number of contaminants including abrasive dirt and dust, component wear particles, and carbonaceous material, to name a few. If allowed to freely circulate throughout the engine, these contaminants can accelerate wear and dramatically reduce the engine's life expectancy.

The most common method of controlling such contamination is through the use of a full flow filtration system. In such a system, oil being driven by a pump must pass through a filter before it is directed to the engine components. This ensures that all the oil being supplied to components has been subjected to at least minimal filtration. However, with full flow filtration, a compromising situation exists between the oil's ability to flow through the filter media and the filter's ability to remove particles.

In a full flow filtration system, particulate contaminants are removed from the oil via surface screening. The arrangement of fibers in the filter media results in openings or passages in which the oil may flow. Particles larger than the openings will be retained at the point of entrance to the media. Particles smaller than the openings will be allowed to pass through. Presently available full flow oil filters generally exhibit a 90-95% removal efficiency of particles 40 microns and larger. Although this type of efficiency dramatically reduces the chance of rapid catastrophic damage to the engine caused by the circulation of large particles, it offers minimal protection against wear. Studies have indicated that the majority of engine component wear today is caused by the circulation of particles in the 5-20 micron range. This size particle is much smaller than any conventional full flow filter can remove with any significant efficiency. By a closer arrangement of the media fibers in the filters, an increase in small particle removal efficiency can be obtained. Here, however, is where the compromise comes into play.

As the fiber orientation is made more dense, oil has a more difficult time flowing through it. As the resistance to flow increases, there is a decrease both in flow volume and oil pressure downstream of the filter. To compensate for these reductions, one could increase the surface area of the now more dense filter. In order to obtain a delta pressure (pressure drop across the media) similar to that of a conventional full flow filter and good filtration efficiency of particles of 5-20 microns, the surface area would have to be increased many times. Generally speaking, this would not be practical from the standpoint of size and cost.

Making the situation even more difficult are four trends within the automotive industry. The first trend is a down-sizing of original equipment and replacement filters. This downsizing is due to limited space in the engine compartment and reduced costs associated with smaller filters. Secondly, oil flow rates in automobiles are increasing. In the past, flow rates of 5-6 gallons per minute (G.P.M.) were typical; today 7-8 G.P.M. rates are not uncommon. Thirdly, engine oils are being exposed to a more severe environment. Elevated operating temperatures and emissions recycling have accelerated internal oil contamination. Finally, many of today's full flow filters are located in areas that are difficult to reach for servicing. As with any servicing operation, the possibility of proper and timely servicing decreases as the difficulty of servicing increases.

One method for improving oil filtration is to add a secondary or by-pass filtration system. By-pass filtration is used in conjunction with the existing full flow system and differs in several respects. First, only a small amount of the output of the oil pump is directed to the by-pass filter. The volume is usually between 5-10% of that being supplied to the engine components. Once the oil has passed through the by-pass filter it is returned to the engine. Because the by-pass filter does not handle high flow rates, media density can be much greater. Not only does this allow for improved small particle removal efficiency, but it often allows for removal of other contaminants not generally removed by conventional full flow filtration, for example, water.

Water generally enters the lubrication system as condensation and/or as a by-product of the combustion process. The effects of water on the oil and ultimately the engine can be devastating. Water promotes corrosion and accelerates the formation of additional acidic corrosive compounds. Its presence adversely affects a lubricant's viscosity. Additives within a lubricant can be hydrolyzed along with the formation of emulsions, thereby reducing the lubricant's effectiveness. The greatest concern is when water, held in a lubricant, is allowed to enter between two heavily loaded engine components. Compression of the water due to the loading will generate high heat. In some cases this heat is sufficient to vaporize the water so intensely that component distress occurs. Generally, the material used in the construction of a by-pass filter media and its design allow for much greater removal of water than that afforded by a conventional full flow filtration system alone.

The by-pass filtration systems on the market today do address some of the problems previously mentioned. Improved small particle efficiency and water removal are common benefits. Increased filtration capacity is accomplished by a now greater surface area to trap contaminants. Because hoses are used to bring oil from the engine to the filter and back, an increase in lubricant system volume occurs. Also, the additional external surface of the hoses and filter result in improved heat dispersion and, in turn, reduced oil temperature.

Unfortunately, present by-pass filtration systems do not address all the problems of full flow filtration and have difficulties of their own. For example, the size of the full flow filter and the difficulty in its servicing remain problems. In fact, many by-pass filtration systems use a filter housing to which a replacement cartridge is installed. Changing such a replacement cartridge can, in itself, be a time-consuming and messy task. Merely getting oil to the by-pass filter and back can be a major installation problem.

In most prior art systems, a pressurized oil passage is tapped to bring oil to the by-pass filter. Placing a tee fitting at the oil pressure sending unit is a common practice. Due to a variety of thread sizes on oil pressure sending units, a number of tee fittings and/or adapters are required to allow a system to be universally installed. Also, with more fittings and connections, a greater propensity for leakage exists. In some cases a sandwich adapter is placed between the full flow filter and the engine block. Oil is then diverted to the by-pass filter as it travels toward the full flow filter. As with the oil pressure sending unit, a variety of thread sizes are needed. More importantly, the adapter increases the space needed for the full flow filter. In many cases, this is not acceptable due to limited space near the engine block.

In returning the oil to the engine, there are two common practices. The first is returning it to a nonpressurized area such as a valve cover or oil pan. Generally, this requires punching a hole that will accept a self-tapping fitting. In some cases drilling is required. Either punching or drilling may pose difficulties when attempted in the engine compartment. In some cases oil is returned via a sandwich adapter similar to that previously described.

In order for the sandwich adapter to function as a return oil passage, oil flow to the full flow filter must be restricted. This creates a pressure differential allowing oil to be directed to the by-pass filter from the higher pressure area and returned to the lower pressure area.

Commonly, the restriction which generates the pressure differential is a fixed port that feeds the inlet side of the full flow filter. In order to create a sufficient pressure differential, the port must be relatively small. Because of its size and its fixed construction, the port makes it difficult to maintain sufficient flow and down line pressure should the by-pass filter circuit become inoperable or subjected to high flow rates. The fixed port type of oil return also must deal with the same thread and size problems as mentioned for the sandwich adapter.

SUMMARY OF THE INVENTION

It is an object of the present invention to provide a remote dual filtration system which improves engine oil cleanliness by exposing the engine oil to an improved level of filtration.

It is another object of the present invention to provide a remote dual filtration system which minimizes engine oil temperature by increasing system fluid volume and increasing surface area thereby improving heat dispersion.

It is a further object of the present invention to provide a remote dual filtration system which reduces the filter service interval due to increased filtering surface area and increased filtering capacity.

It is a still further object of the present invention to provide a remote dual filtration system that is easy to service because the filters are mounted in a more accessible location.

These and other objects and advantages of the present invention are obtained in a remote dual filtration system for an internal combustion engine that includes an adapter for mounting on the engine and through which unfiltered oil is directed from the engine and filtered oil flows to the engine; a remote dual filter mount; hoses for carrying the unfiltered oil from the adapter to the remote fuel mount, and for carrying filtered oil from the remote filter mount to the adapter; a full flow filter mounted on the remote filter mount; a partial flow filter with a high filtering efficiency that is mounted on the remote filter mount; and a means for restricting the flow of oil into the full flow filter so that the oil flow into the partial flow filter is increased.

BRIEF DESCRIPTION OF THE DRAWINGS

The attached drawings are hereby expressly made a part of the specification.

DETAILED DESCRIPTION OF THE PREFERRED EMBODIMENTS

Figure 1:
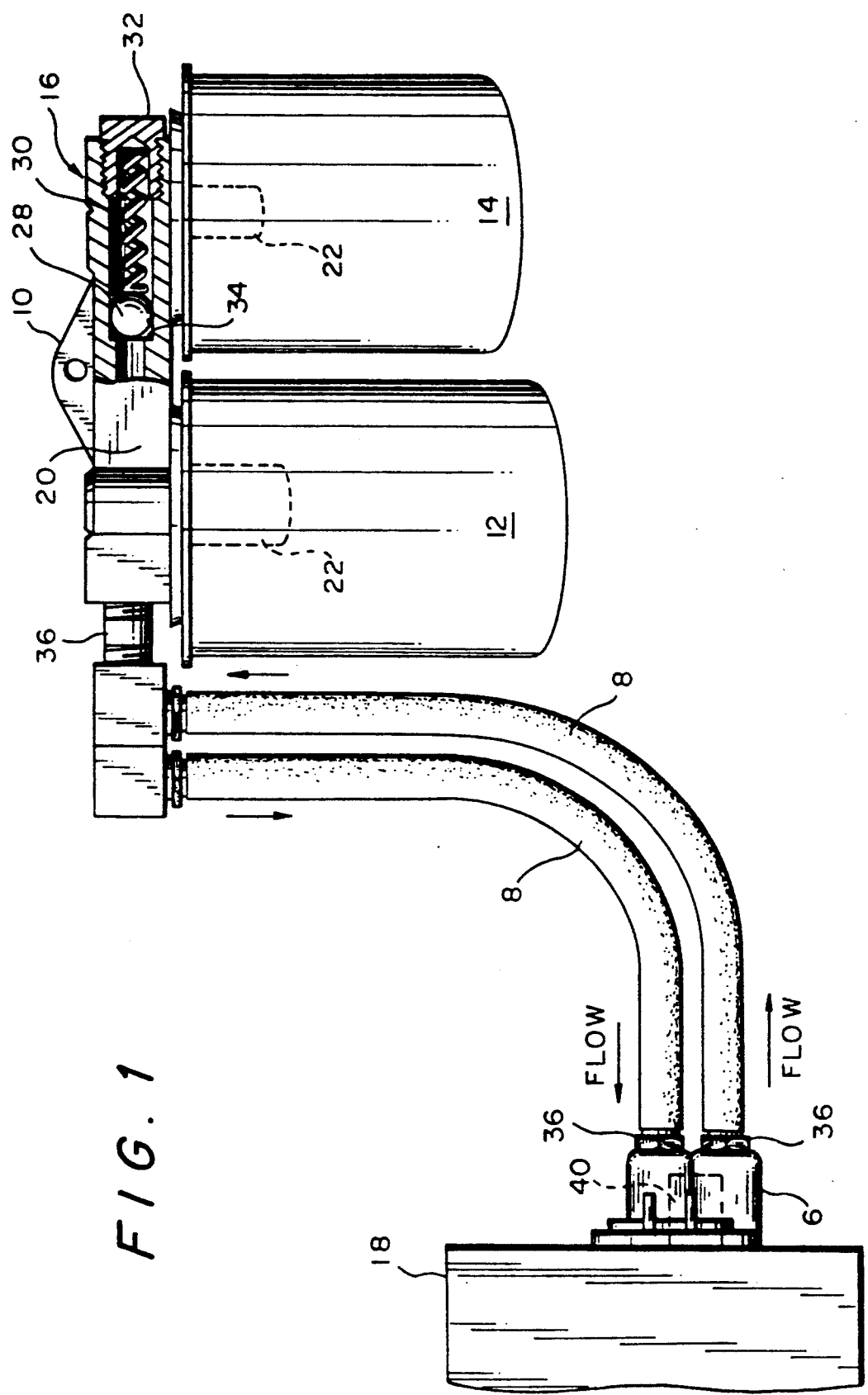
FIG. 1 is a partially sectioned side view of the remote dual filtration system.
Figure 2:
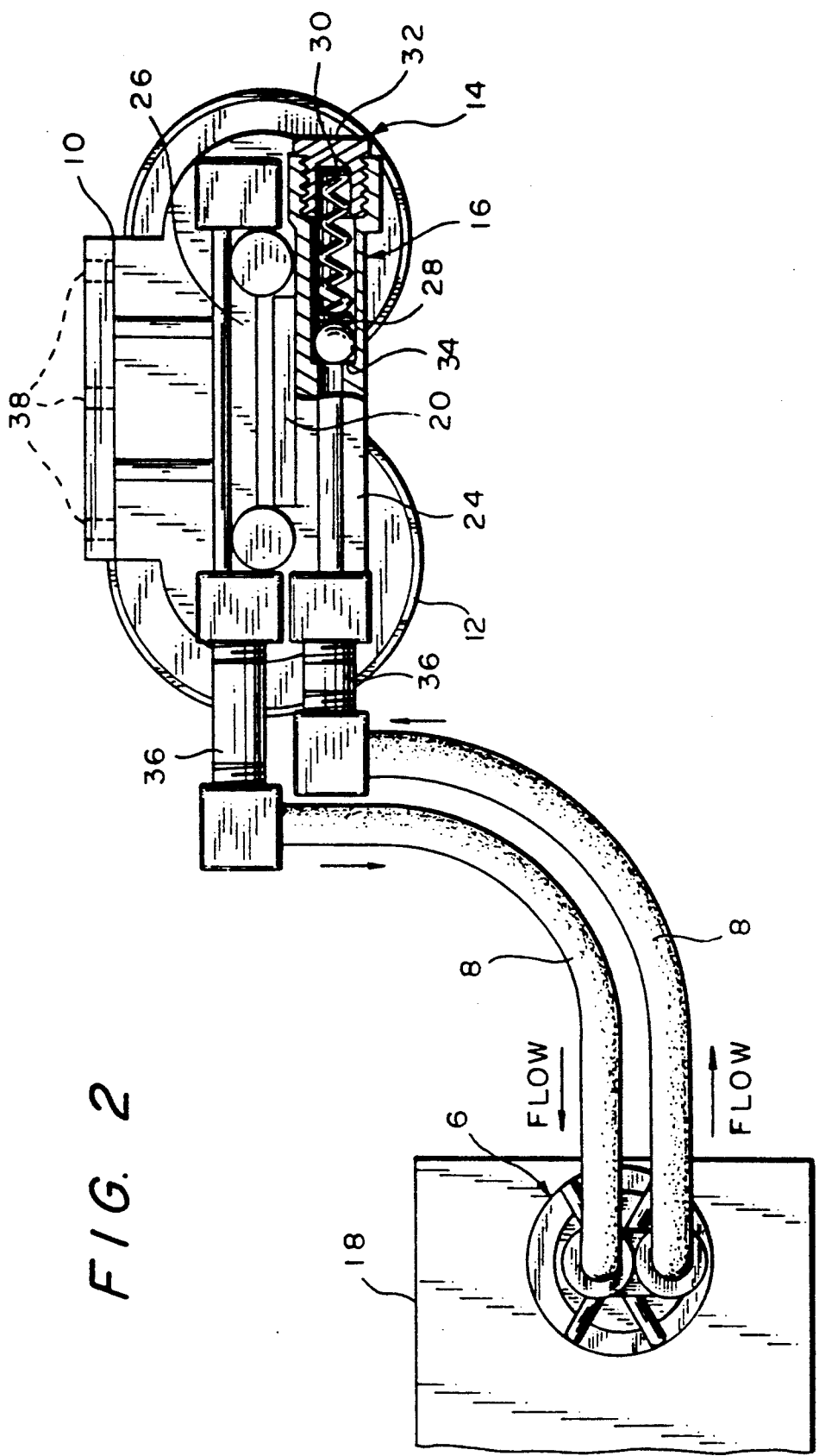
FIG. 2 is a partially sectioned top view of the remote dual filtration system.

Referring to FIGS. 1 and 2, the remote dual filtration system of the present invention includes an adaptor 6 that is threadably mounted on an external mounting member 40 of an internal combustion engine 18. The external mounting member 40 normally receives the original equipment or a replacement full flow filter of the conventional type (not shown). The adapter 6 is commercially available in kit form and includes a variety of bushings which allow the adapter 6 to be mounted on a variety of sizes of external mounts 40. The adapter 6 includes bore holes, one bore hole communicating with unfiltered oil exiting the engine and another bore hole allowing filtered oil to return to the engine. The adapter 6 forms no-part of the present invention.

Hoses 8 interconnect the adapter 6 and swivel joints 36 connected to a remote filter mount 20. The hoses and swivel joints are commercially available components. The hoses 8 carry the unfiltered oil from the adapter 6 to the remote filter mount 20 and filtered oil from the remote filter mount 20 back to the adapter 6 and thence to the engine 18.

The remote dual filter mount 20 includes a bracket 10 for mounting the filter mount 20 at a location remote from the engine, for example, on the sidewall of an engine compartment at an easily accessible location.

Mounted on the remote filter mount 20 are a full flow oil filter 14 and a partial flow oil filter 12. The oil filters 12, 14 are threadably secured to the remote filter mount 20 by nipples 22. The filters 12, 14 are preferably of the spin-on replaceable cartridge type and are mounted on the bottom of the remote mount 20 for ease of servicing. The nipples 22 are preferably of different diameters so that the partial flow and full flow filters are not inadvertently installed in the wrong location.

Because they are mounted remotely from the engine, both the full flow filter 14 and the partial flow filter 12 can be larger than a conventional full flow filter that is mounted directly on the engine. The larger filter size provides a much greater surface area and capacity, thereby allowing for the removal of a larger volume of contaminants. The full flow filter 14 contains a filter media capable of removing particles of about 40 microns and larger. The partial flow filter 12 contains a denser filter media capable of removing particles of about 5 microns and larger, and other contaminants, such as water.

Figure 3:
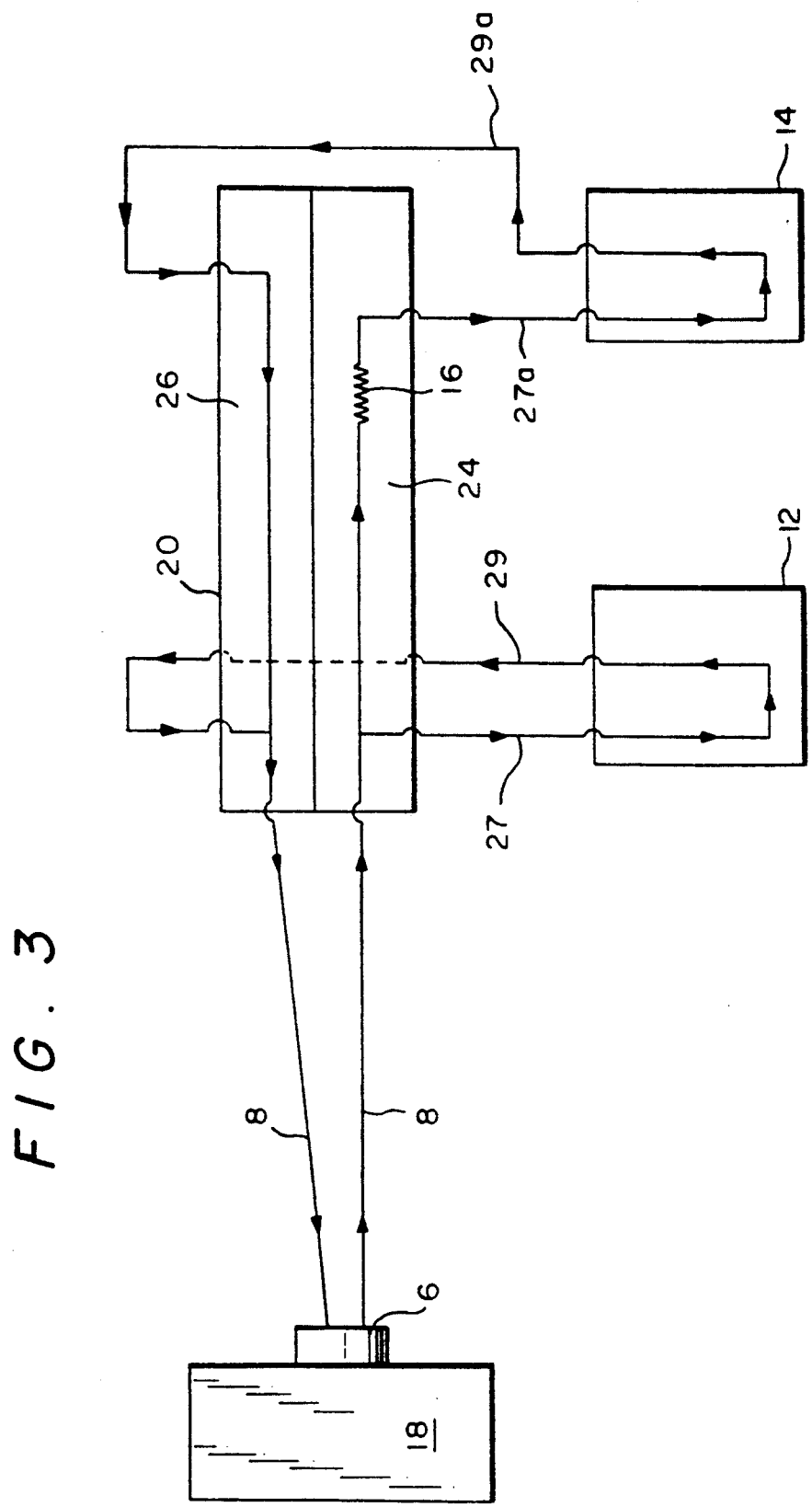
FIG. 3 is a schematic view showing the oil flow through the remote dual filtration system.

As shown schematically in FIG. 3, the two filters 12, 14 are connected in a parallel fashion to the remote mount 20. Because the filters 12, 14 have different media densities, the oil flow will follow the path of least resistance, that is the full flow filter 14 will handle the bulk of the oil flow. Therefore, to improve oil flow through the partial flow filter 12, the partial flow filter 12 is placed upstream of the full flow filter 14, thereby exposing the partial flow filter 12 to the initial incoming oil. Discharge from the partial flow filter 12 is downstream from that of the full flow filter 14. To increase oil flow through the partial flow filter 12 even more, a restricting means 16 for restricting the oil flow is provided just upstream of the full flow filter 14.

The remote dual filter mount 20 includes first and second parallel passages, 24 and 26, respectively. The first passage 24 fluidly communicates with the hose 8 carrying unfiltered oil from the adapter to the remote filter mount 20 and further fluidly communicates with the inlet portions 27 and 27a of the partial and full flow filters 12, 14, respectively. As noted earlier, the inlet portion of the partial flow filter is located upstream from the inlet portion of the full flow filter, to help increase flow through the partial flow filter. The second parallel passage 26 of the remote filter mount 20 fluidly communicates with outlet portions 29 and 29a, respectively, of the partial and full flow filters 12, 14 and further fluidly communicates with the return hose 8 carrying the filtered oil away from the remote filter mount to the adapter 6 and engine 18. The restricting means 16 is placed in the first parallel passage 24, just upstream from the full flow filter 14.

Referring now to FIGS. 1 and 2, the restricting means 16 includes a ball 28 and a spring 30, the ball 28 being disposed upstream from the spring 30. The downstream end of the spring 30 abuts against an end 32 of the first passage 24. Movement of the ball 28 is limited in the upstream direction by a shoulder 34 in the first passage 24. Movement of the ball 28 in the downstream direction is opposed by the spring 30. When the pressure of the oil flowing towards the full flow filter 14 exceeds the force of the spring, the oil forces the ball 28 to compress the spring 30, thereby exposing the inlet port to the filter 14. The greater the movement of the ball 28, the larger the inlet opening to the filter 14. The resistance caused by the spring loaded ball 28 creates a back pressure resulting in increased flow through the partial flow filter 12. The inlet port to the filter 14 provides a more constant flow to the partial flow filter and avoids high flow rate problems associated with sandwich-type adapters. The restriction provided by the loaded ball 28 is normally less than 2 psi. The positioning of the filters 12, 14 and the provision of restricting means 16 increases oil flow in the partial flow filter 12 by 52-77 percent over other types of secondary systems. Therefore, more oil is exposed to finer filtration in a given amount of time without compromising either the filtration system or the engine itself.

After the oil passes through either the partial flow filter 12 or the full flow filter 14, it enters the second or return passage 26. The oil then exits the remote mount 20 and is directed to the engine 18 via the flexible hose 8.

Installation and operation of the system is simple. First, the original full flow filter is removed and discarded. In its place, the cast adapter 6 is threadably mounted on the external mount 40. To allow for variation in nipple threads, the adapter will accept a number of thread adapters. One need only choose the thread adapter that matches the engine filter nipple threads. The cast adapter 6 and thread adapter are simply screwed onto the engine block filter nipple 40.

The adapter 6 is preferable because a variety of fittings or sandwiched adapters is no longer required. The adapter 6 enables installation in varying applications and avoids punching or drilling holes in engine components. Space is no longer a factor due to the small size of the cast adapter 6. The supply of oil and its return are readily accessible and unrestricted.

The remote filter mount 20 is placed in an area generally accessible, promoting ease of filter servicing.

Because, in the present invention, the full flow filter is relocated, the space it occupies is no longer a problem. Therefore, a filter larger than that which the vehicle was originally equipped with can be used. This larger filter provides additional filtration surface area, increased oil and dirt holding capacity, extended filter service life, and offers a greater ability to handle higher oil flow rates.

The remote mounting of the filters allows for ease of filter replacement, helping to insure proper and timely servicing. The use of the partial flow filter improves filtration efficiency, providing high particle removal efficiency even for contaminant sizes below 5 microns. The ability to use larger filters increases filtration capacity thereby increasing the time interval between filter servicing. The larger full flow filter 14 and the partial flow filter 12 provide a much greater surface area allowing for the removal of a large volume of contaminants. The system provides an increase in oil life due to increase in oil capacity and improved filtration efficiency and capacity. As compared to other types of secondary oil filtration systems, the present invention is easier to install. The present invention increases engine (component) life due to a more efficient removal of wear causing contaminants and improved oil condition. The improved oil condition and extended service life result not only from the more effective removal of normal contaminants but also from the removal of contaminants that are not removed by conventional original equipment filtration. The invention allows for more rapid handling of contaminants due to the elevated flow rate of the partial flow filter. The invention also has the environmental advantages of less waste oil being generated, and fewer filters used during the life of the equipment.

While the present invention has been described with respect to its presently preferred embodiment, it is to be recognized that various modifications may be made by those of skill in the art. It is, accordingly, contemplated that the following claims should be interpreted so as to include all those equivalent embodiments within the spirit and scope of the invention.

What is claimed is:

1. A remote dual filtration system for an internal combustion engine having an external mounting member, comprising:
    an adaptor for mounting on said external mounting member and through which unfiltered oil is directed from said engine and filtered oil flows to said engine;
    a remote dual filter mount;
    hoses for carrying said unfiltered oil from said adapter to said remote filter mount, and for carrying filtered oil from said remote filter mount to said adaptor;
    a full flow filter mounted on said remote filter mount;
    a high efficiency partial flow filter mounted on said remote filter mount parallel to said full flow filter, said partial flow filter being more resistant to the flow of oil than said full flow filter;
    said remote dual filter mount including a bracket for mounting the remote dual filter mount at a remote location; said remote dual filter mount further comprising first and second parallel passages, said first passage fluidly communicating said hose carrying said unfiltered oil with inlet portions of said partial and said full flow filters, said inlet portion of said partial flow filter being disposed in an upstream direction from said inlet portion of said full flow filter; said second passage fluidly communicating outlet portions of said partial and said full flow filters with said hose carrying said filtered oil, and means for restricting the flow of oil into said full flow filter relative to said partial flow filter, said restricting means being disposed in said first passage between said inlet portions of said partial and said full flow filters, whereby oil flow into said partial flow filter is increased.

2. The remote dual filtration system of claim 1, wherein said remote dual filter mount further comprises threaded nipples for mounting said partial and said full flow filters, said threaded nipple for mounting said full flow filter having a diameter that is different from a diameter of said threaded nipple for mounting said partial flow filter, and wherein said partial and said full flow filters comprise replaceable spin-on type cartridges mounted below said threaded nipples.

3. The remote dual filtration system of claim 1, wherein said restricting means comprises a ball and a spring, said ball disposed upstream from said spring, a downstream end of said spring abutting against an end of said first passage; movement of said ball being delimited in the upstream direction by a shoulder in said first passage, movement of said ball in the downstream direction being opposed by said spring; wherein said flow of oil into said full flow filter forces said ball against said spring thereby compressing said spring and allowing said oil flow to enter said inlet portion of said full flow filter; and wherein said ball and spring cause the flow of oil into said full flow filter to decrease, thereby increasing the flow of oil into said partial flow filter.

4. The remote dual filtration system of claim 1, further comprising swivel adapters for connecting said hoses to the remote dual filter mount and the adapter, respectively.

5. The remote dual filtration system of claim 1, wherein the full flow filter removes particles of about 40 microns and larger.

6. The remote dual filtration system of claim 1, wherein the partial flow filter removes particles of about 5 microns and larger.

* * * * *